GRINNELL & WILLIAMS.
Potato-Digger.

No. 15,100.  Patented June 10, 1856.

UNITED STATES PATENT OFFICE.

AMOS L. GRINNELL AND JNO. Z. WILLIAMS, OF WILLET, WISCONSIN.

IMPROVEMENT IN POTATO-DIGGERS.

Specification forming part of Letters Patent No. 15,100, dated June 10, 1856.

*To all whom it may concern:*

Be it known that we, AMOS L. GRINNELL and JOHN Z. WILLIAMS, of Willet, in the county of Green and State of Wisconsin, have invented a new and Improved Implement for Digging Potatoes; and we do hereby declare that the following is a full, clear, and exact description of the same, reference being had to the annexed drawings, making a part of this specification, in which—

Figure 1:
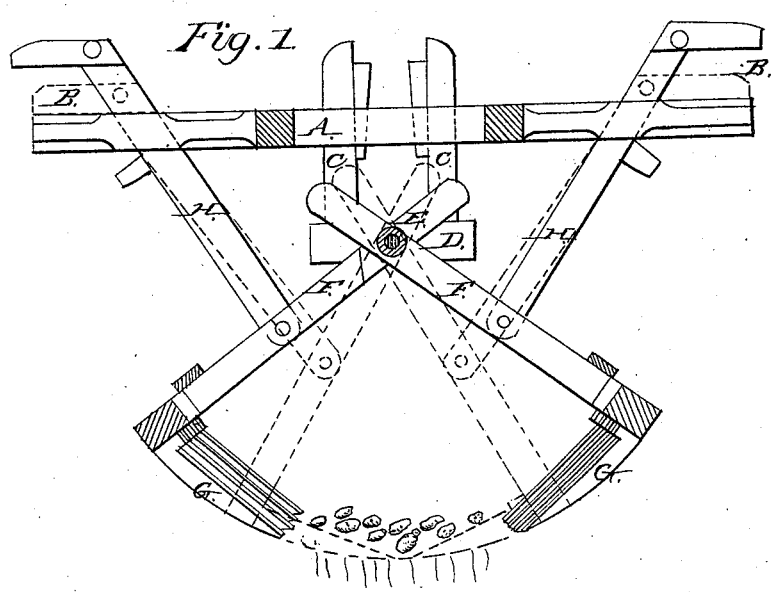
Figure 2:
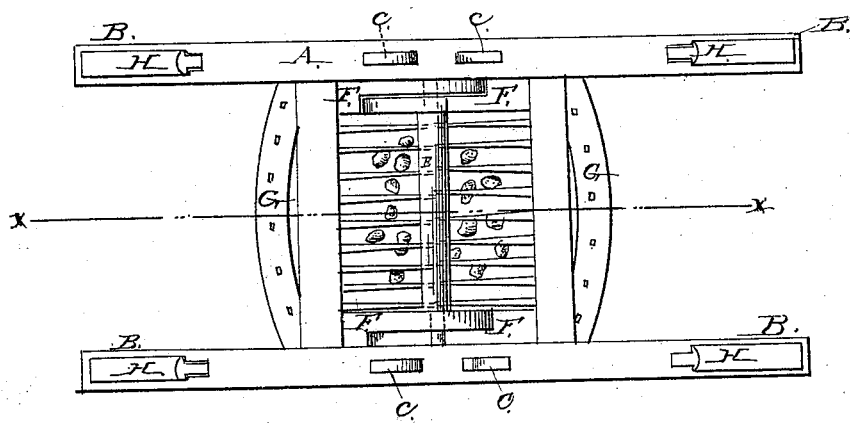

Figure 1 is a longitudinal vertical section of our improvement, *x x*, Fig. 2, showing the plane of section. Fig. 2 is a plan or top view of the same.

Similar letters of reference indicate corresponding parts in the two figures.

The nature of our invention consists in the peculiar construction of the machine, arrangement of rakes, framing, &c., as will be hereinafter fully shown and described.

To enable those skilled in the art to fully understand and construct our invention, we will proceed to describe it.

A represents a rectangular frame, having handles B formed at the ends of its side pieces. To the center of each side piece of the frame there are attached two pendants, C C, the lower ends of which are connected by cross-pieces D.

E is a shaft, which passes transversely through the centers of the cross-pieces D. This shaft has two frames, F F, hung upon it, the lower ends of the frames having rakes G attached to them, one to each. Each frame has two handles, H, attached to it, one at each side, and the handles pass through the side pieces of the frame A.

The rakes G are placed at right angles with the frames F F, and said frames are allowed to work freely on the shaft E.

The implement is used in the following manner: The handles H are raised by two attendants, one being at each end of the frame A, and the two rakes G G will be consequently distended or forced apart, as shown in Fig. 1. The rakes are then pressed into the ground or potato-hills by means of the feet of the operators and by pressing upon the handles H with the hands, the rakes closing or meeting underneath the potatoes. The implement is then raised, the handles B and H being both grasped by the operators, and when the rakes are above the ground or drawn free from it the implement is shook vertically till the earth falls between the teeth of the rakes, leaving the potatoes within them. The rakes are then opened or distended, the potatoes fall out, and the work is continued, as before described.

The above implement is extremely simple and efficient. Much labor will be saved by its use, and it may be constructed at a small cost.

Having thus described our invention, what we claim as new, and desire to secure by Letters Patent, is—

The two rakes G G, attached to the frames F F, the frames being hung on the shaft E, which is connected to the frame A, and the handles H of the frames passing through the side pieces of the frame A, substantially as shown, for the purpose specified.

AMOS L. GRINNELL.
JOHN Z. WILLIAMS.

Witnesses:
E. WESCOTT,
NOAH PHELPS.